United States Patent [19]

Chittineni

[11] Patent Number: 4,916,615

[45] Date of Patent: Apr. 10, 1990

[54] METHOD FOR STRATIGRAPHIC CORRELATION AND REFLECTION CHARACTER ANALYSIS OF SEISMIC SIGNALS

[75] Inventor: Chittibabu Chittineni, Ponca City, Okla.

[73] Assignee: Conoco Inc., Ponca City, Okla.

[21] Appl. No.: 885,516

[22] Filed: Jul. 14, 1986

[51] Int. Cl.$^4$ .............................................. G01V 1/30
[52] U.S. Cl. ...................................... 364/421; 367/73
[58] Field of Search ................... 364/421, 422; 367/73, 367/63, 92

[56] References Cited

U.S. PATENT DOCUMENTS

| | | | |
|---|---|---|---|
| 4,415,999 | 11/1983 | Moeckel et al. | 367/73 |
| 4,422,165 | 12/1983 | Thomas et al. | 367/75 |
| 4,633,401 | 12/1986 | Flinchbaugh | 367/38 |

Primary Examiner—Jerry Smith
Assistant Examiner—Kim Thanh Tbui

[57] ABSTRACT

A method for classifying seismic data which uses a pattern recognition approach to comparing and equating data characteristics. Data is processed for a selected training area of such as a seismic section wherein a stochastic model of the data establishes data characteristics of either non-causal or causal type for selective comparison to similar data characteristics for other test areas of the data thereby to establish or classify similarities and/or distinctions between given training and test areas.

9 Claims, 9 Drawing Sheets

METHOD FOR STRATIGRAPHIC CORRELATION AND REFLECTION CHARACTER ANALYSIS OF SETSMIC SIGNALS

BACKGROUND OF THE INVENTION

1. Field of the Invention

The invention relates generally to the field of digital seismic signal processing and, more particularly, but not by way of limitation, it relates to improved methods for pattern recognition as applied to the classification and analysis of seismic signals, particularly seismic section data.

2. Description of the Prior Art

There are various prior procedures for examination of seismic data in order to establish meaningful data indications. All of the prior approaches to seismic energy analysis, whether effected manually, on specialized processing machines, or on digital or analog computers under control of any of various software dictates, all utilize either visual or linear correlation of data groups or indications in order to establish meaningful data findings. In general, the prior methods each embody an inadequacy due to the fact that the spacings of stratigraphic reflectors will change non-linearly from region to region on a seismic section. Thus, the prior methods attempted to operate with a built-in or inherent defect in their operation. Applicant is not aware of any prior art that attempts to characterize seismic reflection characteristics using a stochastic modeling procedure.

SUMMARY OF THE INVENTION

The present invention relates to a method for examining seismic data within a statistical decision framework in order to distinguish selected areas of seismic data on the basis of reflection character. Thus, the procedure uses stochastic models to characterize seismic reflection characteristics within a given training area of interest and, thereafter, this reflection characteristic data can be compared with like data from another seismic area of interest in order to establish a degree of similarity or other distinguishing criteria. The technique may establish a stochastic model of either noncausal or causal type depending upon how the seismic signal at a sample point is predicted based on the information from its neighborhood.

Therefore, it is an object of the present invention to develop stochastic seismic signal data models for subsequent use in a probablistic framework for such as performing stratigraphic correlations and delineation of anomalous structure on seismic section data.

It is also an object of the invention to provide a statistical analysis method for the detection and identification of reflection continuity in the presence of data loss on the section.

Also, it is an object of the invention to provide a method for segmentation or classification of different groups of reflection characteristics on a seismic section.

Finally, it is an object of the invention to classify seismic reflection data on a statistical basis without regard to visual or linear correlation of data.

Other objects and advantages of the invention will be evident from the following detailed description when read in conjunction with the accompanying drawings which illustrate the invention.

BRIEF DESCRIPTION OF THE DRAWINGS

FIG. 6 illustrates a region of a seismic section as it is utilized in characterization of the causal model;

DETAILED DESCRIPTION OF THE INVENTION

Figure 1:
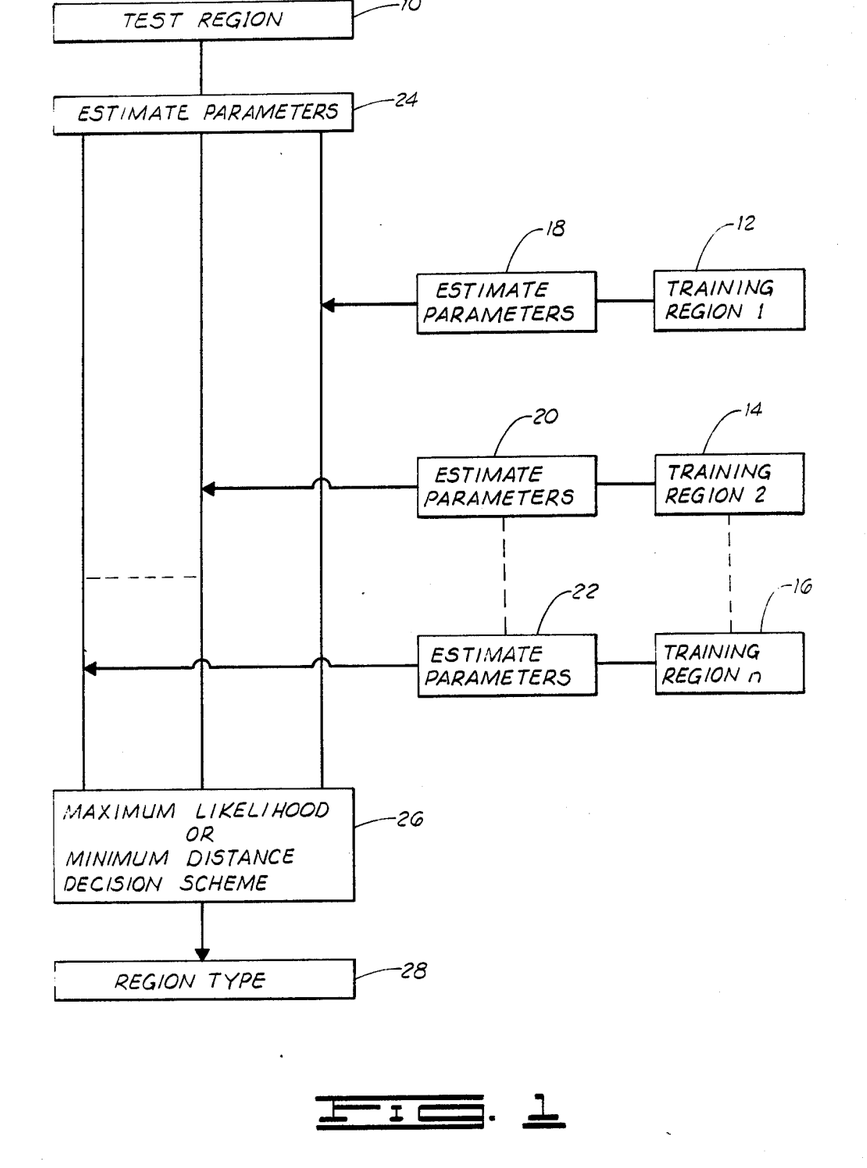
FIG. 1 is a flow diagram of the general steps of the process of the present invention.

FIG. 1 illustrates the method of the present invention for stratigraphic correlation and reflection character analysis. A problem common to the objectives is to classify a test region 10 into one of the given n types of training region 12, 14 through 16. The region characterization scheme of FIG. 1 illustrates the basic procedures wherein it is desirable to classify the character of test region 10 relative to plural selected training regions 12, 14 and 16.

The reflection signal characteristics of test region 10 as well as training regions 12–16 are stochastically modeled and a set of parameters are estimated for each region. The test region 10 is classified into one of the training types, i.e. regions 12–16, by using a decision scheme, either (i) that based upon maximum likelihood concepts or (ii) that based upon distance between the distributions of the data in the test and training regions. Both noncausal and causal models may be used for region characterization.

Within a seismic section there may be any number of different anomalies of interest and these can generally be broken down into plural training regions such as regions 12–16 which exhibit particular characteristics visually. Such characteristics which it may be desirable to classify or relate more broadly either over the entire seismic section or to individual test regions 10. The training regions 12–16 are then stochastically modeled on a probability basis to estimate parameters for each individual training region 12–16 as at estimate stages 18, 20 and 22. In like manner, the data of test region 10 would also undergo estimation of parameters, as at stage 24, and the test parameters would then be compared to the groups of parameters from the training regions 12–16 to determine most similarity. Thus, the stage 26 would determine similarities on either a maximum likelihood or minimum distance decision scheme, as will be further described. The decision will then output data identifying the particular region type as at output stage 28.

Figure 2:
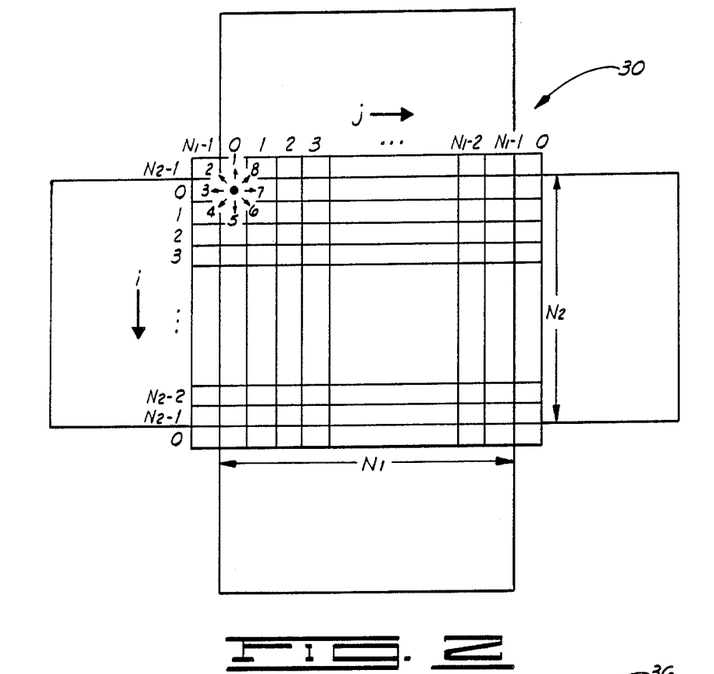
FIG. 2 is a schematic illustration of a seismic section region with its neighboring periods.

Region parameter estimation may be effected using a non-causal model such as that of FIG. 2. FIG. 2 illustrates a region 30 having neighboring periods as shown. Let us allow that the region 30 contains $N_1$ columns and $N_2$ rows and that it is periodic in nature.

The signal value at a sample point of the region 30 is modeled as a weighted combination of signal values in a two-dimensional window around the sample point and an additive noise term. Let $\theta$ contain the weights and the noise is taken as Gaussian with zero mean and unit variance. The noise is independent and identically distributed from sample to sample. Let Y be the row stacked version of the elements of the region 30 and let u be the row stacked version of noise elements. Using the periodic property of the region we can write $$A(\theta)Y = \beta^{\frac{1}{2}}u \qquad (1)$$

where $\beta$ is a constant that specifies the variance of the noise. The matrix $A(\theta)$ is block circulant and of size $NN_2 \times N_1N_2$. That is $$A(\theta) = \begin{bmatrix} A_0 & A_1 \ldots A_{N_2-1} \\ A_1 & A_0 \ldots A_{N_2-2} \\ \vdots & \\ A_{N_2-1} & A_{N_2-2} \ldots A_0 \end{bmatrix} \qquad (2)$$

The matrix elements $A_j$ of $A(\theta)$ are circulant and of size $N_1 \times N_1$. Thus, we can write $$A_j = \begin{bmatrix} A_{j0} & A_{j1} \ldots A_{jN_1-1} \\ A_{j1} & A_{j0} \ldots A_{jN_1-2} \\ \vdots & \\ A_{jN_1-1} & A_{jN_1-2} \ldots A_{j0} \end{bmatrix} \qquad (3)$$

Figure 3:
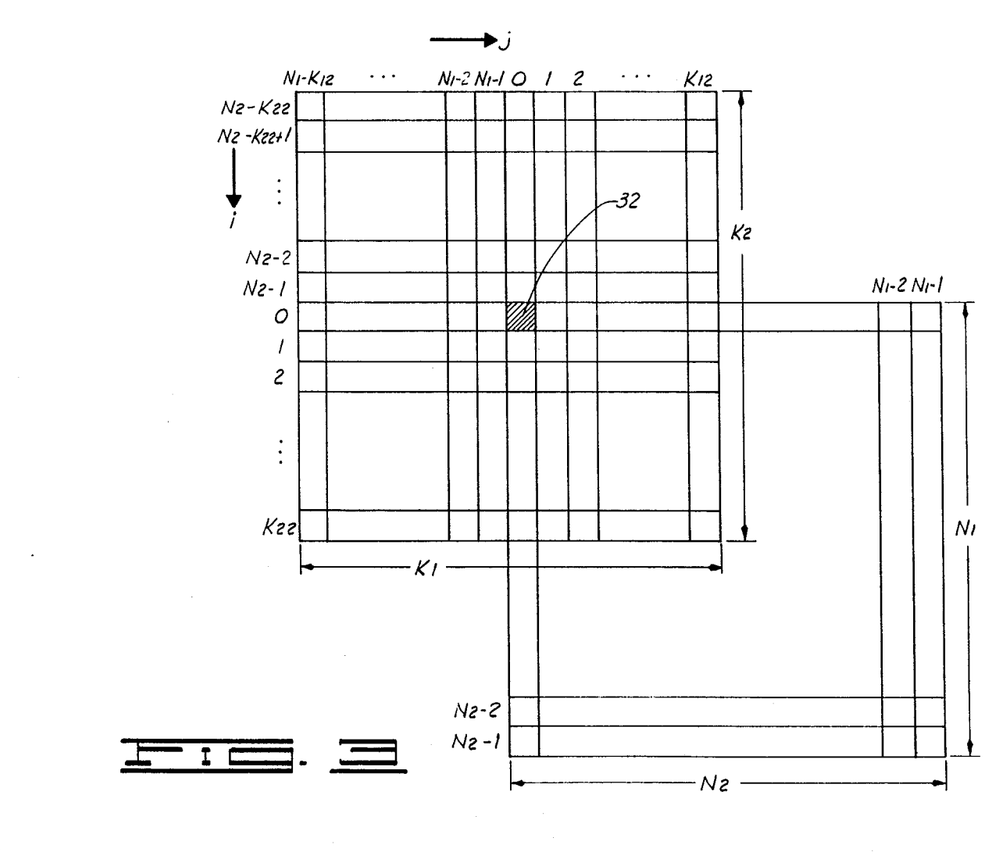
FIG. 3 is a schematic drawing of a sample point of a seismic section region showing its two-dimensional neighborhood in surround.
Figure 4:
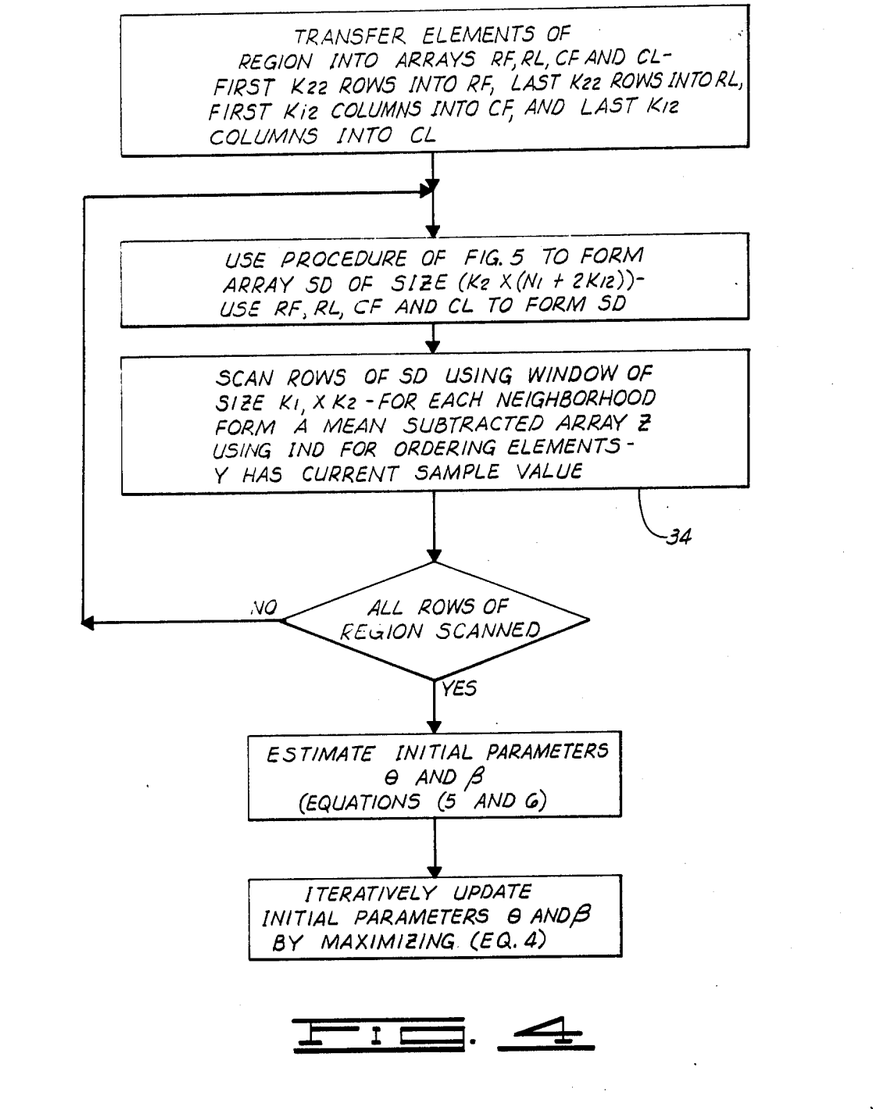
FIG. 4 is a flow diagram illustrating computation of the noncausal model parameter estimation procedure.

Referring to FIG. 3, a sample point of the region at the position (0,0) and its rectangular neighborhood of size $K_1 \times K_2$ are shown. This amounts to a sample point 32 of the region 30 and its two-dimensional neighborhood. Let $K_1$ and $K_2$ be odd, and let $K_{12} = K_1|2$ and $K_{22} = K_2|2$ be the integers obtained by truncation. The first rows of circulant matrix elements $A_O, A_1, \ldots,$ $A_{N_2-1}$ of the block circulant matrix $A(\theta)$ are shown in FIG. 4. The indices of the parameter $\theta$ are given in FIG. 3. The elements of the index vector IND are used to form a weighted combination of sample values in the window. The elements of the index vector IND are identified in FIG. 4 and would be equated to specific matrix elements as shown in Table I.

TABLE I
ELEMENTS OF INDEX VECTOR $A_o$: $\{1, -(0,1), -(0,2), \ldots, -(0,K_{12}), 0, \ldots, 0, -(0,-K_{12}), -(0,-K_{12}+1), \ldots, -(0,-1)\}$
IND: $0 \quad 1 \quad 2 \ldots K_{12} \ldots N_1-K_{12} \quad N_1-K_{12}+1 \ldots N_1-1$ $A_1$: $\{-(1,0), -(1,1), -(1,2), \ldots, -(1,K_{12}), 0, \ldots, 0, -(1,-K_{12}), -(1,-K_{12}+1), \ldots, -(1,-1)\}$
IND: $N_1 \quad N_1+1 \quad N_1+2 \quad N_1+K_{12} \quad 2N_1-K_{12} \quad 2N_1-K_{12}+1 \quad 2N_1-1$ $A_{N_2-1}$: $\{-(-1,0), -(-1,1), -(-1,2), \ldots, -(-1,K_{12}), 0, \ldots, 0, -(-1,-K_{12}), -(-1,-K_{12}+1), \ldots, -(-1,-1)\}$
IND: $(N_2-1)N_1 \quad (N_2-1)N_1+1 \quad (N_2-1)N_1+2 \quad (N_2-1)N_1+K_{12} \quad (N_2-1)N_2+(N_1-K_{12}) \quad N_1N_2-1$ With u being Gaussian, the likelihood function of Y given the parameters $\theta$ and $\beta$ can be written as $$p(Y/\theta,\beta) = (2\pi\beta)^{\frac{-N_1N_2}{2}} |A(\theta)| \exp\left[-\frac{1}{2\beta} Y^T A^T(\theta)A(\theta)Y\right] = \qquad (4)$$

$$\left[\sum_{k=0}^{N_1N_2-1} \lambda k\right]\left\{\sum_{s \in \Omega} \frac{\pi}{(2\pi\beta)^{\frac{1}{2}}} \exp\left[\frac{-1}{2\beta}(y(s) - \theta^T x(s))^2\right]\right\}$$

where $\lambda_k$ are the eigenvalues of the block circulant matrix $A(\theta)$. $\lambda_k$ are the functions of the parameter vector $\theta$. $\Omega$ denotes the region being considered, and s specifies the central point of a two-dimensional neighborhood, and x(s) is a vector of sample values formed by using the index vector IND. The eigenvalues $\lambda_k$ are computed by exploiting the block circulant properties of $A(\theta)$. That is, they are the fourier coefficients of the elements of the first row of $A(\theta)$. The maximum likelihood estimates of the parameters and are obtained by iteratively maximizing Equation (4). The initial values of $\theta$ and $\beta$ can be determined using least squares approximation. They are $$\left.\begin{array}{l}\theta_o = W^{-1}G \\ \text{and } \beta_o = H - G^T\theta_o\end{array}\right\} \qquad (5)$$

where
$$\left.\begin{array}{l}W = \frac{1}{N_1N_2}\left[\sum_{s\in\Omega} x(s)x^T(s)\right] \\ G = \frac{1}{N_1N_2}\left[\sum_{s\in\Omega} y(s)x(s)\right] \\ \text{and } H = \frac{1}{N_1N_2}\sum_{s\in\Omega} y^2(s)\end{array}\right\} \qquad (6)$$

Figure 5:
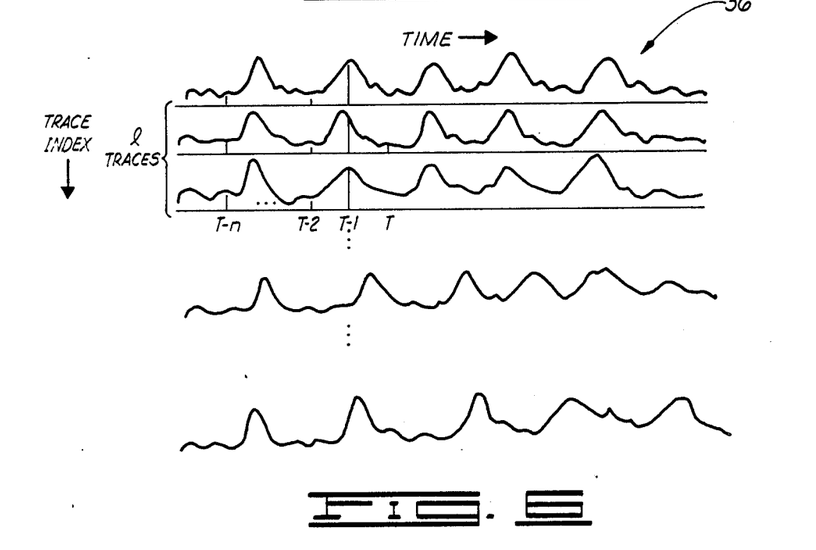
FIG. 5 is a flow diagram illustrating the sequence of steps for scanning the rows of a seismic reflection data region.

The computations consists of scanning the rows of the region by setting up a two-dimensional array SD whose row dimesion is equal to the row dimension of the two-dimensional window. The first $K_1$ rows of the regions are transferred into SD after taking the periodicity of the data into account. Thereafter, the computations are repeated by adding a row to and deleting a row from SD until all of the rows of the region have been scanned. The computations for model parameter estimation using noncausal models are summarized in FIGS. 4 and 5.

Region characterization may also be estimated with causal models derived from a region of seismic section in trace format as shown in FIG. 6. Thus, a region 36 is defined by selecting a time portion of a plurality of successive traces of a seismic section. Letting x(i,t) be the tth sample of an ith trace, and letting $\hat{x}(i,t)$, be an estimate of x(i,t). Then, the estimate $\hat{x}(i,t)$ may be written as $$\hat{x}(i,t) = \sum_{j=1}^{n} X^T(i, t - j) f_j \qquad (7)$$

where $f_j$ is an l×1 vector of weights, l is the number of channels and n is the number of samples of each channel. The data vector X(i,t) of l channels at time t is given by $$X(i,t) = \left[ x\left(i - \frac{l}{2}, t\right), x\left(i - \frac{l}{2} + 1, t\right), \ldots, x(i,t), \ldots, x\left(i + \frac{l}{2} - 1, t\right), x\left(i + \frac{l}{2}, t\right) \right]^T \qquad (8)$$

The error e(i,t) in the estimation of x(i,t) can be written as $$e(i,t) = x(i,t) - \hat{x}(i,t) \qquad (9)$$

Let e(i,t) be Gaussian with mean zero and variance s. Let it also be independent from sample to sample. The the variation in the data essentially arises because of the variation in e(i,t). The likelihood function of the data, given the parameters $f_j$, n, and s, can be written as $$p(x|f_j,s) = L(f_j,n,s) = \prod_i \prod_t \frac{1}{\sqrt{2\pi s}} \exp\left[ -\frac{1}{2s} e^2(i,t) \right] \qquad (10)$$

Taking the logarithm of Equation (10), we get $$LL(f_j,n,s) = \sum_i \sum_t - \left[ \log s + \frac{1}{s} e^2(i,t) \right] + \text{a constant} \qquad (11)$$

Differentiation of Equation (11) with respect to s and equating the resulting expression to zero yields $$s = \left[ \sum_i \sum_t e^2(i,t) / \sum_i \sum_t (1) \right] \qquad (12)$$

Using Equation (12) in Equation (11), it can easily be shown that the maximization of Equation (11) is equivalent to the minimization of $\epsilon^2$ given by the following:

$$\epsilon^2 = \left[ \sum_i \sum_t \left( x(i,t) - \sum_{j=1}^{n} X^T(i, t - j) f_j \right)^2 / \sum_i \sum_t (1) \right] \qquad (13)$$

Differentiation of Equation (13) with respect to the coefficient vectors $f_j$ and equating the resulting expressions to zero yields $$\phi_{XX}(0) f_k + \sum_{\substack{l=1 \\ \neq k}}^{n} \phi_{XX}(l - k) f_l = \phi_{XX}(k) \qquad (14)$$

$$k = 1, 2, \ldots, n$$

where $$\phi_{XX}(l_1 - l_2) = \left[ \sum_i \sum_t X(i, t - l_1) X^T(i, t - l_2) / \sum_i \sum_t (1) \right],$$

$$\phi_{xX}(k) = \left[ \sum_i \sum_t x(i, t) X(i, t - k) / \sum_i \sum_t (1) \right], \text{ and}$$

$$\phi_{XX}(l_1 - l_2) = \phi_{XX}^T(l_2 - l_1).$$

Equations (14) can be efficiently solved using a multichannel generalization of the Levinson algorithm. Substitution of (14) into (13) yields an expression for the minimum value of $\epsilon^2$ as $$\epsilon^2_{min} = \sum_i \sum_t x^2(i,t) - \sum_{l=1}^{n} f_l^T \phi_{xX}(l) \qquad (15)$$

$$\text{let } f_0 = \begin{bmatrix} 0 \\ 0 \\ 1 \\ 0 \\ 0 \end{bmatrix}, \hat{f} = \begin{bmatrix} f_0 \\ -f_1 \\ \vdots \\ -f_n \end{bmatrix}, \text{ and } \phi_{xX} = \begin{bmatrix} \phi_{xx}(0) \\ \phi_{xx}(1) \\ \vdots \\ \phi_{xx}(n) \end{bmatrix} \qquad (16)$$

From Equations (15) and (16), we get $$\epsilon^2_{min} = \hat{f}^T \phi_{xX} \qquad (17)$$

From Equation (12), s can be written as $$\begin{aligned} s &= \sum_{l=0}^{n} f_l^T \phi_{XX}(0) f_l + 2 \sum_{l_1=0}^{n-1} \sum_{l_2=l_1+1}^{n} f_{l_1}^T \phi_{XX}(l_2 - l_1) f_{l_2} \\ &= tr\left[ \sum_{l=0}^{n} \phi_{XX}(0) f_i f_i^T + \sum_{k=1}^{n} \phi_{XX}(k) \sum_{i=0}^{n-k} f_{i+k} f_i^T \right] \\ &= tr\left[ \sum_{k=0}^{n} \phi_{XX}(k) \sum_{i=0}^{n-k} f_{i+k} f_i^T \right] \end{aligned} \qquad (18)$$

Region recognition may be effected as at stage 26 (FIG. 1), and the test region can be classified into one of the training region types either on the basis of the maximum likelihood decisions or the distance between distributions of data. Thus, based on the maximum likelihood decision, the test region may be identified. The likelihood that the data from a selected test region comes from a distribution of the kth training region with the parameters $\theta_k$ and $\beta_k$ can be written as $$p(Y|\theta_k,\beta_k) = \left(\prod_{l=0}^{N_1N_2-1} \lambda_{kl}\right) \frac{1}{(2\pi\beta_k)^{\frac{N_1N_2}{2}}} \exp\left[\frac{1}{-2\beta_k} \sum_{s\in\Omega} (y(s) - k^T x(s))^2\right] \quad (19)$$

Where $\lambda_{kl}$ are eigenvalues of $A(\theta_k)$ and $\Omega$ is the kth training region. Taking the logarithm of Equation (19), the kth discriminate function $DF_k$ becomes $$DF_k = CM_k - \frac{1}{2\beta_k} \sum_{s\in\Omega} (y(s) - \theta_k{}^t x(s))^2 \quad (20)$$

where $$CM_k = \sum_{l=0}^{N_1N_2-1} \log(\lambda_{kl}) - \frac{N_1N_2}{2} \log(\beta_k) \quad (21)$$

The quantity $DF_k$ serves as a measure of similarity between the kth training region and the test region. The test region is recognized as being of the type of Kth training region if $$DF_K = \max_k DF_k, \ 1 \leq k \leq M \quad (22)$$

A test region can also be classified as similar to a specific training region using causal modeling based on distance between data distributions in the regions. Thus, the distance $J_k$ can be computed between the data distribution of Kth training region and the test region from the expression $$J_k = \frac{\beta_t}{\beta_k}\left[\sum_{l=0}^{M_1M_2-1d} \frac{k_l^2}{d_{tl}^2}\right] + \frac{\beta_k}{\beta_t}\left[\sum_{l=0}^{M_1M_2-1} \frac{d_{tl}^2}{d_{kl}^2}\right] \quad (23)$$

where $(\theta_k, \beta_k)$ are the estimated parameters of the kth training region and $(\theta_t, \beta_t)$ are the estimated parameters of the test region. Also, $d_{k\,l}$ are the eigenvalues of $A(\theta_k)$ and $d_{tl}$ are the eigenvalues of $A(\theta_t)$. The test region is recognized as the type of training region K for which $$J_K = \min\{j_k\}, \ 1 \leq k \leq M \quad (24)$$

In the above, the divergence information measured between the distribution of the data in each of the training regions and the test region is used as a measure of similarity or distance between the distribution in recognizing the test region type as one of the training regions. Treating the distribution of the data in the training and test regions as Gaussian with zero mean, we can then write $$p(Y|\theta_k,\beta_k) \sim N(O,C_k)$$

and $$p(Y|\theta_t,\beta_t) \sim N(O,C_t) \quad (25)$$

where N stands for normal distribution and $$C_k = \beta_k A^{-1}(\theta_k)(A^{-1}(\theta_k))^T, \ 1 \leq k \leq M$$

and $$C_E = \beta_t A^{-1}(\theta_t)(A^{-1}(\theta_t))^T \quad (26)$$

For zero mean Gaussian distribution, the divergence information between the kth training region and the test region can be written as $$J_k = tr(C_t C_k^{-1} + C_k C_t^{-1}) \quad (27)$$

Let W be a matrix that diagonalizes the block circulant matrices $A(\theta_k)$ and $A(\theta_t)$ of the training and test regions.

$$A(\theta_k)W = WD_k \quad (28)$$

Where $D_k$ is the diagonal matrix having the eigenvalues of $A(\theta_k)$ as its diagonal elements. We also have $$\left.\begin{array}{l} WW^{-1} = I \\ \text{and } W^T = W^{-1} \end{array}\right\} \quad (29)$$

From Equations (28) and (29), we can write $$\left.\begin{array}{l} A^{-1}(\theta_k) = WD_k^{-1} W^{-1} \\ \text{and } ((A^{-1}(\theta_k))^T)^{-1} (W^T)^{-1} D_k ((W^{-1})^T)^{-1} \end{array}\right\} \quad (30)$$

Similar relations exist for block circulant matrices $A(\theta_t)$. From Equations (26) and (27)-(30), we obtain $$\begin{aligned} tr(C_t C_k^{-1}) &= tr\left\{[\beta_t A^{-1}(\theta_t)(A^{-1}(\theta_t))^T]\left[\frac{1}{\beta_k}((A^{-1}(\theta_k))^T)^{-1} A(\theta_k)\right]\right\} \\ &= tr\left\{\frac{\beta_t}{\beta_k}[(W^{-1})^T D_t^{-1} D_k((W^{-1})^T)^{-1}][W(D_k D_t^{-1}) W^{-1}]\right\} \\ &= \frac{\beta_t}{\beta_k} \sum_{l=0}^{M_1M_2-1}\left(\frac{d_{kl}^2}{d_{tl}^2}\right) \end{aligned} \quad (31)$$

where $d_{kl}$ and $d_{tl}$ are the diagonal elements of $D_k$ and $D_t$, respectively. Substitution of Equation (31) into Equation (27) then yields Equation (23).

Figure 7:
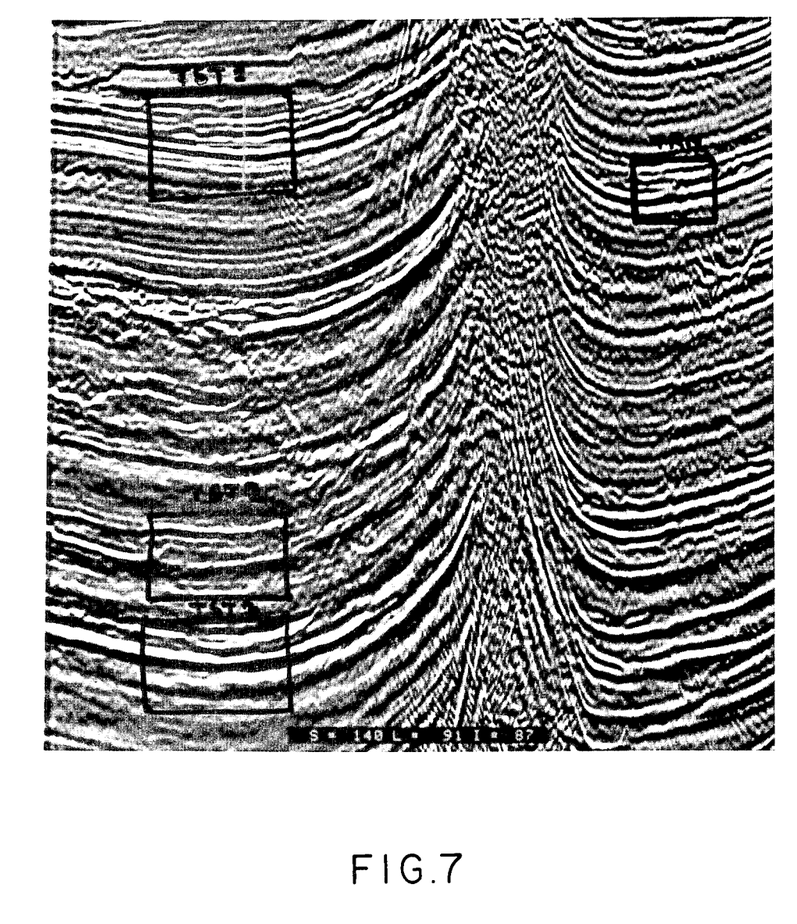
FIG. 7 is a black and white reproduction of a seismic section illustrating correlation of reflection packages across a salt dome.
Figure 8:
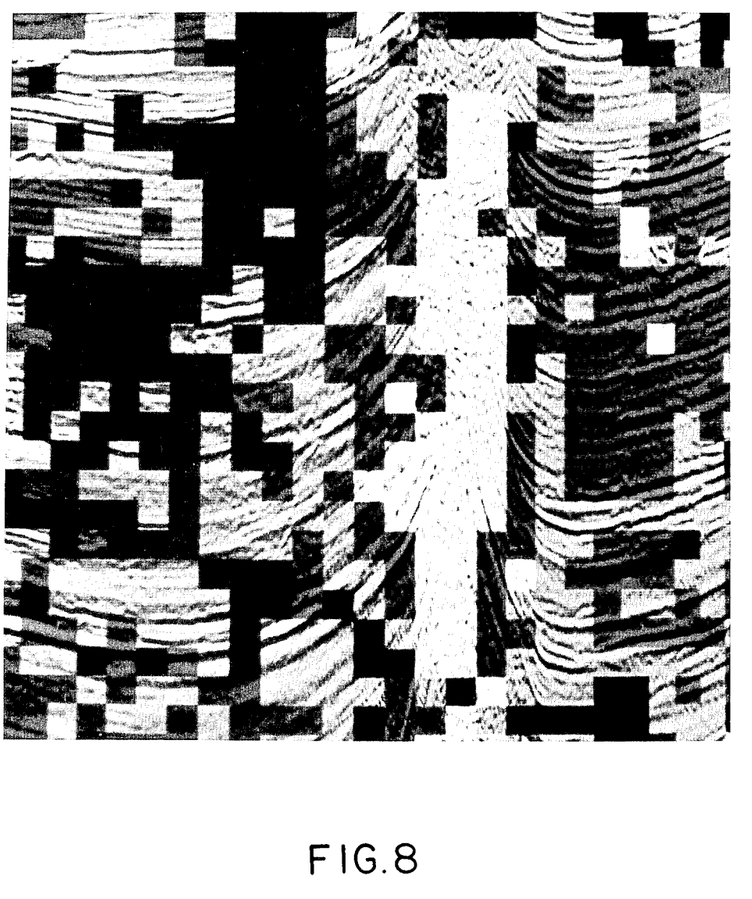
FIG. 8 is a black and white reproduction of a photograph illustrating the delineation of the salt dome with reflection character identification.
Figure 9:
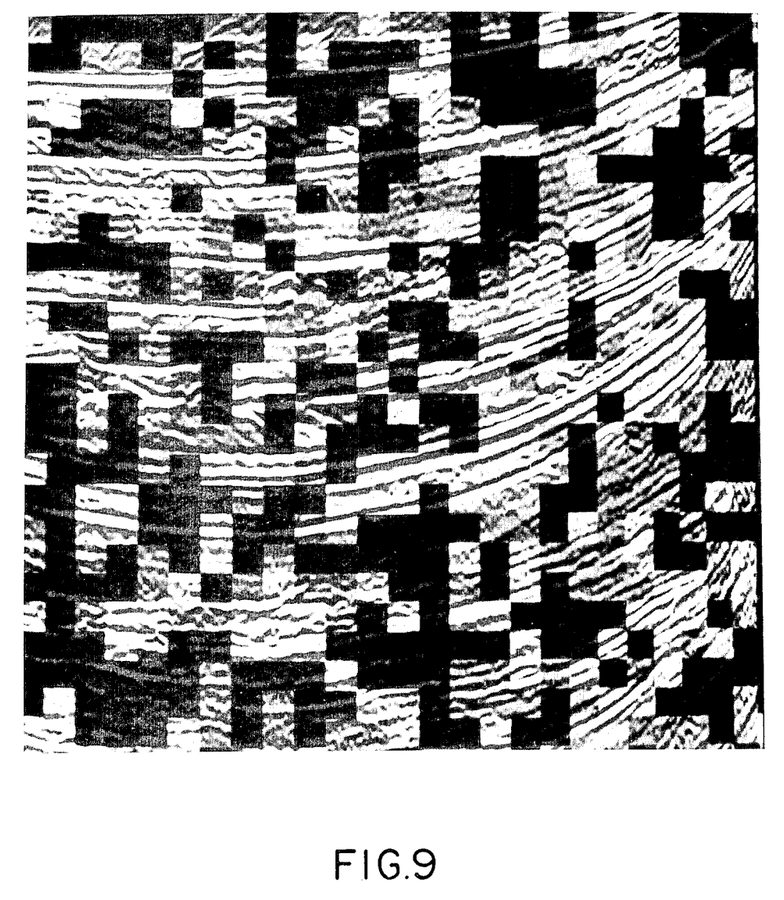
FIG. 9 is a black and white reproduction of a photograph illustrating segmentation of seismic reflection data into plural packages of different reflection characteristics.
Figure 10:
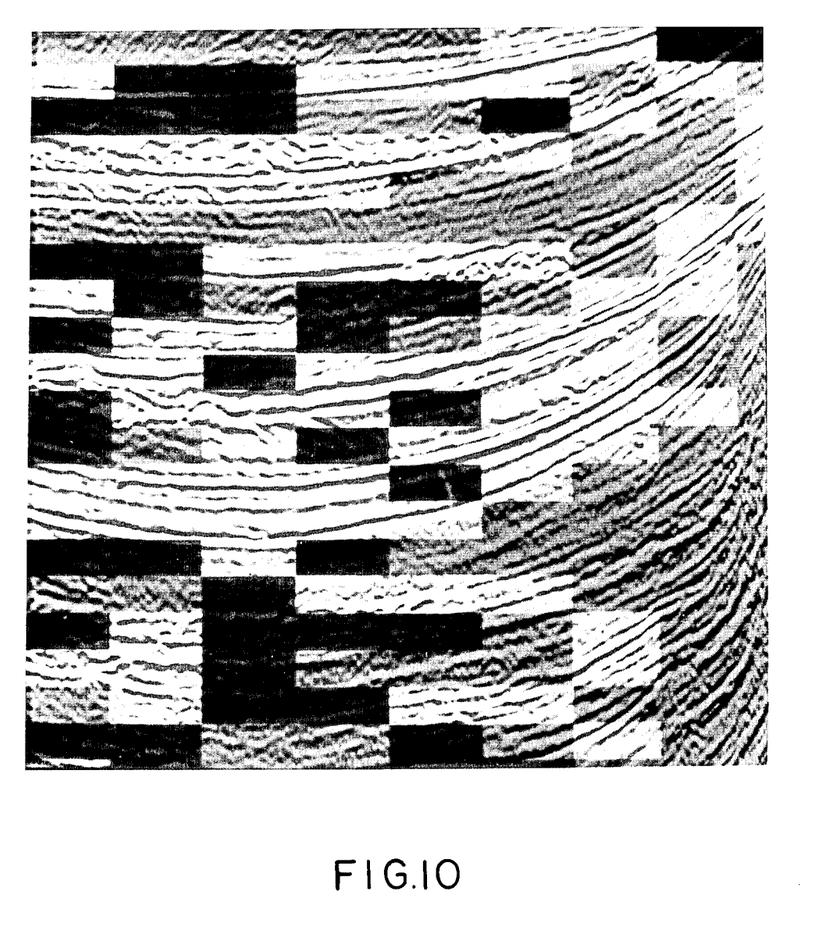
FIG. 10 is a black and white production of the seismic section illustrating reflection character identification by image segmentation.

FIGS. 7–10 illustrate some test results that were achieved using the pattern recognition of the present invention. The testing was performed on compressional wave seismic data profiles selected from a region having anomalies that particularly benefit from the evaluation scheme of the present invention. Thus, the basic data of FIGS. 7 and 8 show a subsurface region having a distinct salt dome that divides the subsurface region. The seismic data of FIGS. 9 and 10 illustrates data from a different overall section that is similar in slope and character to subterrain adjacent a dome structure.

The first application of the present reflection character analysis technique is illustrated in FIG. 7 wherein it is the aim to detect continuation of specific horizons from one side to the other of the salt dome in the presence of loss of data due to the salt dome. Thus, a training region 40, as outlined in crayon was, selected as a region of particular interest and the procedure was directed toward establishing that same reflection character in a test region over on the left hand side of the salt dome 42. Thus, three test regions 44, 46 and 48 were selected as possible candidates for the continuity of reflection horizons in the training or template region 40. A non-causal stochastic model was first fit to the template or training region 40. Thirty trace by thirty sample area test regions 44, 46 and 48 were then statistically modeled. The divergence distance measure was used as a measure of similarity between each test subregion 44, 46 and 48 and the template region 40, and the location of maximum correlation was identified as indicated by a cross in test region 44. After initial identification of the general region, more careful examination verified the conclusion that the continuity of reflection horizons was correctly identified.

Another application of the present method is illustrated by the photo reproduction of FIG. 8 which shows the delineation of salt dome 42 and reflection character identification in color overlay of one of four classes of reflection character. Four training regions were selected for their four types of distinctly different criteria. One such region is selected to represent the salt dome, while three remaining different character training regions were identified. The fcolor differentiation of the photograph is in four shades of green or gray tone as shown. Non-causal stochastic models were fit to the training regions. The seismic section was then divided into subregions of size 25 traces by 25 samples and the statistical models for each of the four training regions were compared to each of the subregions to establish best fit by computation of the measure of similarity between each subregion and the most similar training region. It may readily be seen that the salt dome 42 is fairly accurately delineated as to reflection character and other areas of specific reflection character may also be classified as at darkest section 50 on the left of the dome and an intermediate green section 52 on the right, each of these being predominately of one shade of indicator.

Referring to FIG. 9, the technique of the present invention is applied to carry out segmentation of the seismic section 54 into individual reflection packages of certain characteristics. Four training regions were initially selected and the seismic section was divided into subregions of size 25 traces by 25 samples. Stochastic models were then determined for the training and test regions, and test subregions were identified into one of the training region types having maximum similarity. Thus, FIG. 9 illustrates a seismic section segmented into packages of different reflection characteristics, four different classes in all.

The seismic image of FIG. 10 illustrates the same seismic section as classified into three different types of reflection characteristics. Here again, we have a segmentation operation wherein similarity of characteristics was determined over a different training area. In FIG. 10 the test and training regions were selected in a basic size of 75 traces by 25 samples, this contributing to the elongated, rectangular general pattern.

The foregoing discloses a novel method of seismic data interpretation using machine processing which employs basic pattern recognition techniques in the classification and correlation of seismic data. Use of the present method brings still another tool to the geophysicist for use in interpreting subsurface data representations, and the application of pattern recognition techniques enables identification of new parameters and type comparisons between various forms of data.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the the invention in which an exclusive property or privilege is claimed are as follows:

1. A method for classifying seismic signal data for comparison and evaluation of discontinuous seismic section data, comprising the steps of:
   inputting a selected section of seismic signal data;
   examining seismic signal data for a selected two-dimensional test area and at least one two-dimensional training area to establish a stochastic model of reflection character data for said test area and the at least one training area; and
   using the test area reflection character data in comparison with reflection character data derived for the at least one training area to provide relative classification as between the data characteristics for said test area and the at least one training area.

2. A method as set forth in claim 1 wherein said step of using, comprises:
   establishing a noncausal model based on maximum likelihood decision between estimated parameters of periodic neighborhoods of each of the test area and at least one training area.

3. A method as set forth in claim 2 wherein:
   said noncausal model is derived by treating selected sample points in the respective area as periodic with each seismic signal sample point expressed as a weighted combination of signal samples in the local neighborhood wherein each sample point is the center of its local neighborhood.

4. A method as set forth in claim 1 wherein said step of using, comprises:
   establishing a causal model using the data in trace format as estimated for periodic sample points of a two dimensional region consisting of plural traces each a selected number of sample points in length for each of said test area and at least one training area.

5. A method as set forth in claim 4 wherein:
   said causal model is a function of seismic reflection data values of the respective area for periodic time windows in two dimensional displacement over said training area.

6. A method as set forth in claim 1 which further includes:
   comparing the reflection character data of the test area and at least one selected training area to effect stratigraphic correlation as between selected regions of a seismic section.

7. A method as set forth in claim 1 which further includes:
  comparing the reflection character data of the test area and at least one selected training area to detect continuity of a same reflection character across a seismic section expanse exhibiting data loss.

8. A method as set forth in claim 7 wherein: said seismic section expanse is an intervening dome structure.

9. A method as set forth in claim 1 which further includes:
  comparing the reflection character data of at least one test area and at least one selected training area to effect segmentation of a seismic section into areas of differing reflection characteristics.

* * * * *